(12) United States Patent
Fink (10) Patent No.: US 10,178,832 B2
(45) Date of Patent: Jan. 15, 2019

(54) STRIPPER HARVESTING APPARATUS WHEREIN THE PROCESSING DEVICES EXTEND OVER A PREDOMINANT OR THE ENTIRE PART OF THE WORKING WIDTH AND WHEREIN AIR FROM A FAN AND THE CROP STRIPPER ROTOR AIR STREAM FLOW THROUGH THE CLEANING AIR CHANNEL

(71) Applicant: Lucian Andrej Fink, Kirchheim/Teck (DE)

(72) Inventor: Lucian Andrej Fink, Kirchheim/Teck (DE)

( * ) Notice: Subject to any disclaimer, the term of this patent is extended or adjusted under 35 U.S.C. 154(b) by 45 days.

(21) Appl. No.: 15/479,440

(22) Filed: Apr. 5, 2017

(65) Prior Publication Data

US 2017/0202148 A1    Jul. 20, 2017

Related U.S. Application Data

(63) Continuation of application No. PCT/DE2015/000508, filed on Oct. 6, 2015.

(30) Foreign Application Priority Data

Oct. 6, 2014    (DE) .................. 10 2014 014 871

(51) Int. Cl.
*A01F 12/18*    (2006.01)
*A01D 41/06*    (2006.01)
(Continued)

(52) U.S. Cl.
CPC ............ *A01F 12/182* (2013.01); *A01D 41/06* (2013.01); *A01D 41/08* (2013.01); *A01D 45/04* (2013.01);
(Continued)

(58) Field of Classification Search
CPC ...... A01F 12/182; A01F 12/444; A01F 12/32; A01F 7/067; A01F 12/48; A01D 63/00; A01D 45/04; A01D 41/08; A01D 41/06
See application file for complete search history.

(56) References Cited

U.S. PATENT DOCUMENTS

| 1,370,919 A | * | 3/1921 | Schaefer | ................ A01D 41/08 56/1 |
| 2,495,417 A | * | 1/1950 | McConnel | ............. A01D 41/08 56/129 |

(Continued)

FOREIGN PATENT DOCUMENTS

| DE | 39 18 393 A1 | 12/1989 |
| DE | 690 09 723 T2 | 1/1995 |

(Continued)

OTHER PUBLICATIONS

International Search Report of PCT/DE2015/000508, dated Jul. 6, 2016.

(Continued)

*Primary Examiner* — Arpad Fabian-Kovacs
(74) *Attorney, Agent, or Firm* — Collard & Roe, P.C.

(57) ABSTRACT

A harvesting apparatus for harvesting cereal grains, rice, grains or seeds, is operated as a front, side or rear attachment and has a crop stripper extending over a working width which is generating a rotor air stream, an inclined chute having a first edge facing the crop stripper and a second edge facing away from the crop stripper. The second edge is disposed to lie lower than the first edge facing the crop stripper and is attached between a threshing apparatus and a separation apparatus which extend over the predominant or the entire part of the working width. The harvesting apparatus has a cleaning air channel, wherein air from a fan and the crop stripper rotor air stream flow through the cleaning (Continued)

air channel for cleaning the crop. The cleaning air channel extends over the predominant part or the entirety of the working width.

23 Claims, 5 Drawing Sheets (51) Int. Cl.
*A01D 41/08* (2006.01)
*A01D 45/04* (2006.01)
*A01D 63/00* (2006.01)
*A01F 7/06* (2006.01)
*A01F 12/32* (2006.01)
*A01F 12/48* (2006.01)
*A01F 12/44* (2006.01)

(52) U.S. Cl.
CPC .............. *A01D 63/00* (2013.01); *A01F 7/067* (2013.01); *A01F 12/32* (2013.01); *A01F 12/444* (2013.01); *A01F 12/48* (2013.01)

(56) References Cited

U.S. PATENT DOCUMENTS

| | | | |
|---|---|---|---|
| 4,373,322 A * | 2/1983 | Beisel | A01D 45/30 56/126 |
| 4,507,910 A * | 4/1985 | Thornley | A01D 41/141 56/10.2 E |
| 4,578,934 A * | 4/1986 | West | A01D 41/08 56/12.9 |
| 4,578,937 A * | 4/1986 | West | A01D 41/08 56/130 |
| 4,587,799 A * | 5/1986 | Thomas | A01D 45/30 56/126 |
| 4,790,128 A | 12/1988 | Klinner | |
| 4,843,806 A * | 7/1989 | Klinner | A01D 41/06 56/364 |
| 4,896,486 A * | 1/1990 | Lundahl | A01D 41/06 56/10.2 E |
| 4,951,451 A * | 8/1990 | Klinner | A01D 41/06 460/140 |
| 4,991,385 A | 2/1991 | Klinner | |
| 5,036,653 A | 8/1991 | Klinner | |
| 5,044,147 A | 9/1991 | Klinner | |
| 5,175,984 A | 1/1993 | Hale et al. | |
| 5,185,991 A * | 2/1993 | Klinner | A01D 41/06 56/128 |
| 5,199,248 A * | 4/1993 | Hale | A01D 41/06 56/10.2 E |
| 5,299,413 A | 4/1994 | Gale | |
| 5,678,397 A | 10/1997 | Shelbourne et al. | |
| 5,974,772 A * | 11/1999 | Chuksin | A01D 41/06 56/128 |
| 6,960,131 B2 * | 11/2005 | Moser | A01D 45/22 460/131 |
| 6,988,354 B1 * | 1/2006 | Pargmann | A01D 90/04 56/341 |
| 7,124,568 B2 * | 10/2006 | Hotaling | A01F 15/106 56/341 |
| 2002/0004418 A1 * | 1/2002 | Mesquita | A01D 41/06 460/115 |
| 2006/0185340 A1 | 8/2006 | Eyre | |

FOREIGN PATENT DOCUMENTS

| | | |
|---|---|---|
| DE | 35 87 945 T2 | 3/1995 |
| DE | 691 09 659 T2 | 9/1995 |
| DE | 38 54 083 T2 | 3/1996 |
| DE | 195 81 928 T1 | 3/1998 |
| DE | 695 23 504 T2 | 5/2002 |
| EA | 200900219 A1 | 2/2010 |
| EP | 0 346 342 B1 | 7/1994 |
| GB | 2 200 526 A | 8/1988 |
| GB | 2 219 919 A | 12/1989 |
| JP | 2012-000084 A | 1/2012 |

OTHER PUBLICATIONS

English Translation of International Preliminary Report on Patentability of PCT/DE2015/000508, dated Apr. 6, 2017.

* cited by examiner

STRIPPER HARVESTING APPARATUS WHEREIN THE PROCESSING DEVICES EXTEND OVER A PREDOMINANT OR THE ENTIRE PART OF THE WORKING WIDTH AND WHEREIN AIR FROM A FAN AND THE CROP STRIPPER ROTOR AIR STREAM FLOW THROUGH THE CLEANING AIR CHANNEL

CROSS REFERENCE TO RELATED APPLICATIONS

Applicant claims priority and this application is a continuation under 35 U.S.C. § 120 of International Application No. PCT/DE2015/000508 filed Oct. 6, 2015, which claims priority under 35 U.S.C. § 119 of German Application No. 10 2014 014 871.8 filed on Oct. 6, 2014. The International Application under PCT article 21(2) was not published in English. The disclosures of the aforesaid International Application and German Application are incorporated herein by reference.

BACKGROUND OF THE INVENTION

1. Field of the Invention

The invention comprises a harvesting apparatus for harvesting cereal grains, rice, grains, seeds, or the like, which apparatus is operated as a front, side or rear attachment.

2. Description of the Related Art

Crop strippers, as they are disclosed in the patent application GB 2 200 526 A and the U.S. Pat. No. 4,991,385 A, strip crop from the stems and ears. An adjustable hood presses the crop downward and passes it to the crop stripper rotor. This heavy, non-transparent hood composed of sheet steel prevents the crop from being slung away and ensures the flow of material to further conveying apparatuses. By means of this method, clearly greater throughput performance of the combine is achieved than when using a conventional cutting mechanism attachment, because material other than grain get into the machine only slightly, and a specific proportion of grains, seeds is already separated by means of the stripping process.

Crop strippers extend the harvesting window, because they work more independently of the straw moisture. They cannot, however, be used in all cultures. Nevertheless, the suitable cultures have the greatest share of crop rotation. Subsequently, the crop is passed to a narrower channel that is situated in the combine. There, threshing apparatuses are installed, which thresh, beat, rub, centrifuge or the like the grains out of the crop stream with drums, rotors, and separate them by means of a threshing concave, or straw walkers. The grains are removed and separated from the material other than grain in the cleaning shoe of a combine, by means of wind and screen cleaning. Bulk material conveyors convey the cleaned crop further. A disadvantage is that the layer thicknesses in the threshing channel, separation channel, cleaning channel are high, and this makes the process more difficult. The crop must furthermore travel a long, deflected path in the harvesting attachment and the harvesting machine to get to the threshing, separation, cleaning apparatuses, and this increases the weight and complexity of these apparatuses, and the power and energy demand is high, due to many drives.

Preferably, the material other than crop stream is thrown out as a swath, or chopped up uniformly spreaded onto the field, but doing so is very difficult due to the working width, wind, and other factors, and requires a high energy consumption. This circumstance often makes subsequent agricultural methods more difficult.

A known crop stripper rotor has a complicated construction. Furthermore, a crop stripper harvesting attachment does not possess its own drive or threshing, separation, cleaning, and bunker systems. Chassis, support and castoring gauge wheels are for ground following capabilities, stress relief, and for transport of harvesting attachments.

A combine having a harvesting attachment, which binds much capital and energy, has a complex construction, is heavy, large, hard to handle and furthermore can be used only for a short time of the year. Tractors and self-propelled support vehicles, in contrast, are versatile agricultural vehicles that can be used all year round. They offer an ideal power source and attachment spaces for machines and equipment. Efficiency, simplicity, reliability, robustness, easy repair, and low maintenance effort of the harvesting machines are demanded in order to optimally utilize the harvesting window.

SUMMARY OF THE INVENTION

The harvesting apparatus according to the invention in contrast has the advantage that because of its simple, robust method of construction, easy to manage devices having a high throughput performance are made available.

The harvesting apparatus according to the invention, particularly for cereal grains, rice, seeds, grains, which is operated from an agricultural vehicle, in order to efficiently achieve very high throughput performance, preferably has a modular structure. Aside from the stripping apparatus, inclined chute, threshing apparatus, separation apparatus, cleaning air channel, any required blower device, bunker systems, conveying systems as well as systems for cutting or chopping, and process apparatuses are preferably reduced to a minimum and completely installed in the harvesting attachment, over the entire and/or almost the entire working width. An attached running gear supports the harvesting apparatus and relieves stress on it during field work and transport work.

Further advantages and advantageous embodiments of the invention can be derived from the following description, the claims, and the drawings.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
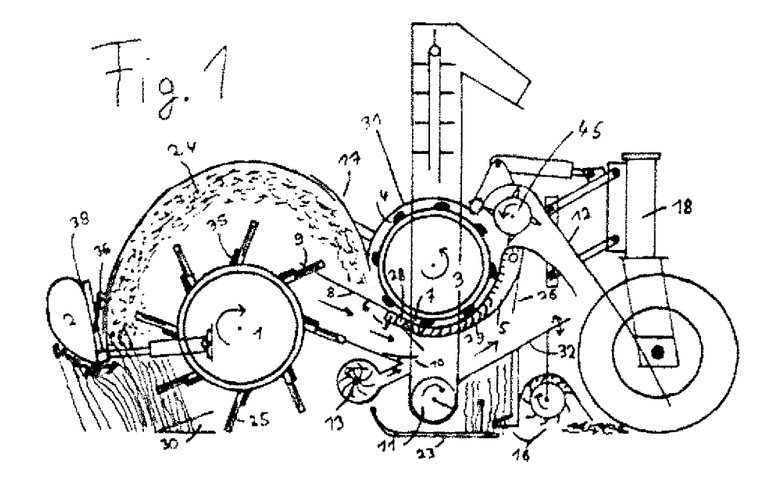
FIG. 1 is a side view of a harvesting apparatus according to the invention.
Figure 2:
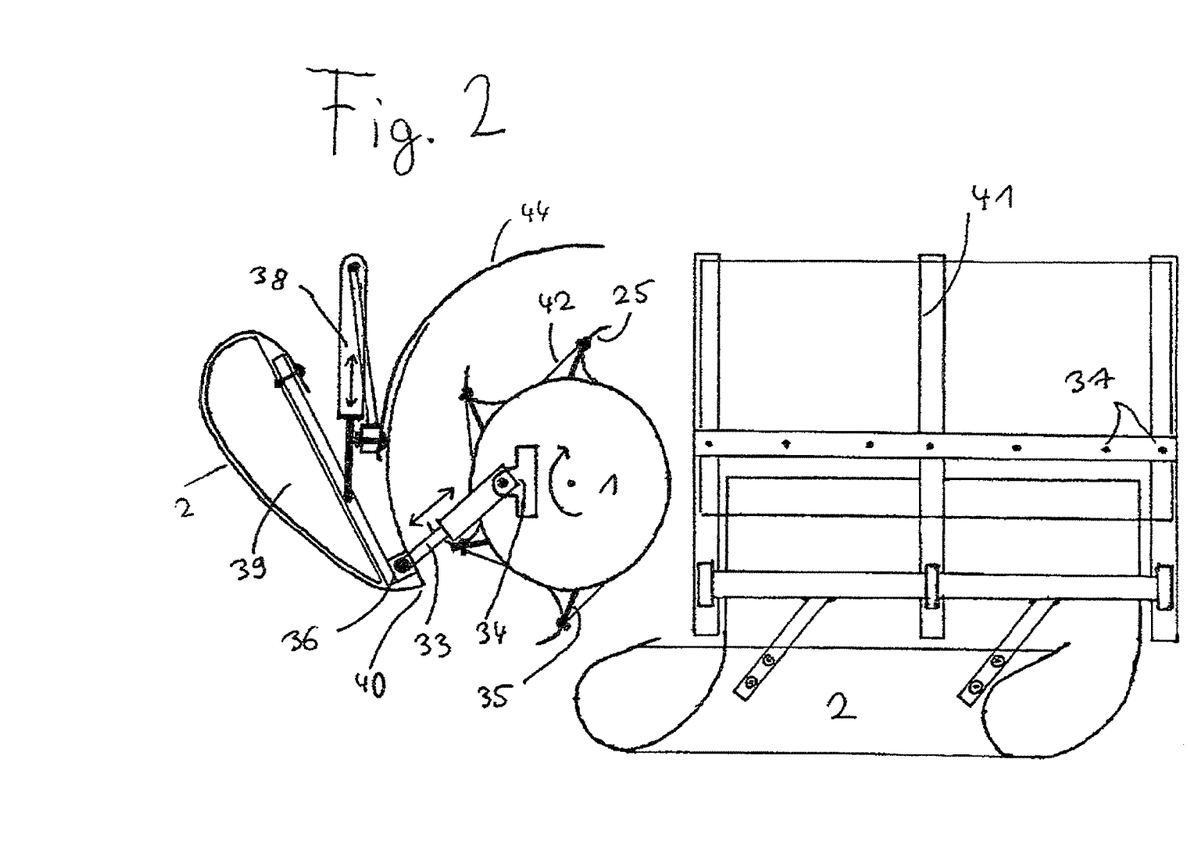
FIG. 2 is a side view (left side) of an adjustable nose hood and a top view (right side) of a nose hood.

FIG. 1 shows a side view of a harvesting apparatus according to the invention, and FIG. 2 shows a side view (left side) of a nose hood 2, 44, and a top view (right side) of a nose hood 2. In the direction of forward travel, crop 24 is pressed down by a nose hood 2 that can be adjusted in height. The nose hood 2, 44 and all other coverings, such as, for example, a spray guard/dust protection cover 12, a flap 17, a machine covering 31, are preferably made of light, flexible, transparent, breakage-resistant, impact-resistant, self-reinforcing, anti-static, UV-resistant plastic, particularly polycarbonate plastic, preferably Makrolon, Lexan, Margard.

The hood shape is easy to structure because of the flexibility of the plastic. The hood reinforces itself as the result of its adaptation to radii, curves, and bends. Preferably, the nose hood 2, 44 is attached to the structural hollow sections 36, tubes, or the like, which have a stable shape over large working widths, by means of screw bolts 37. Adjustable telescoping arms 33, which are suspended on ball bearings 34, allow optimal adaptation of the adjustable nose hood 2 to the harvesting conditions with a raising and lowering mechanism 38. The lower, adjustable part of the nose hood 2 lies closely against the upper, fixed nose hood 44, on the inside, due to the tension of the plastic, particularly of the polycarbonate plastic, so as to be adjustable, and thereby optimal sliding hood adjustment and the best possible flow of material of the crop 24 are guaranteed. A folded edge 40 of the hood, preferably folded by 90 degrees, angles the nose hood 2 forward into its rolled shape. Shape-fit nose support elements 39 increase the rigidity of the hood. The nose hood 2, 44 lies on the frame of the harvesting apparatus by means of a hood support/running track 41, and can be fixed in place on the apparatus or moved up and down. When used for work at night, the nose hoods 2, 44, and coverings, such as a spray guard/dust protection cover 12, for example, a flap 17, a machine covering 31 are lighted from the inside and/or outside, in order to allow the operator an optimal view of the apparatuses at all times. In this way, the machine settings can be optimized, and damage or foreign bodies can quickly be recognized.

The crop stripper rotor 1, which can be adjusted in terms of its speed of rotation, rotates clockwise and is preferably built from a tubular profile, which has great rotational shape stability, good processing, production, and balancing properties, and the required basic body, preferably between 250-500 mm. The tubular cylinder has support elements 35, preferably flatirons, welded on at an angle of 10-30 degrees upward from the horizontal of the tube axis, at the outer edge of the tubular body, in the turning or rotation point of the side view (FIG. 1), on which elements the crop stripper fingers 25 (strips) are attached by means of screw bolts. The stripping fingers (crop stripper fingers 25) engage into the crop 24 and strip the ears, grains, seeds or the like off the stalks. The crop stripper fingers 25 preferably have a slit shape that ends in a radius, having a recess depression downward (FIG. 1, 25), which prevents the grains, seeds from being sprayed away forward. They can be structured to be straight and/or half-round, as a C profile 25 (FIG. 2), by means of a divided tube, metal sheet, or plastic.

In the case of flattened, lodged cereal plants, installed crop lifters 30 can raise the crop 24 and pass it to the respective stripping slits. The grain/material other than grain mixture is conveyed by means of the nose hood 2, 44, the momentum of the stripping process, the air stream of the crop stripper rotor 1, by means of a finger chute (finger comb 9, chute 8), directly from above, pulled apart, accelerated, and tangentially conveyed between a threshing apparatus 3, which has rasp bars, beater/rubbing strips 4, and a separation apparatus 5. The chute 8 is structured to be anti-static and has very good slide properties. It can be adjusted in terms of its inclination (preferably greater than 20 degrees), and thereby adapted to the respective crop 24 and working conditions. In this way, a sufficient feed height of the threshing apparatus, separation apparatus is achieved, which offers room for intensive cleaning, bulk material transport, and bunker space underneath. Alternatively, the possibility exists to install a transport apparatus, which feeds the crop 24 to the threshing apparatus 3.

A low layer thickness in the threshing, separation, cleaning apparatuses is achieved because the mixture has already been partially threshed by means of the crop stripper rotor 1, and supplied to the threshing apparatus 3, 4 over the entire working width. In this way, the threshing, cleaning, and separation performance is increased, and this allows a very high throughput performance of the harvesting apparatus to be achieved.

The threshing, separation, cleaning apparatuses are protected against damage by means of a foreign body separator which can be emptied, has a foreign body collection recess 28, and is affixed ahead of the threshing concave (separation apparatus 5) and the pre-separator 7.

Grains that have already been stripped off can be passed directly to the cleaning apparatus, in the cleaning air channel, which is indicated with arrows in the figures, below the threshing apparatus, separation apparatus, by means of a pre-separator 7 that can be installed and is directly connected with the separation apparatus 5 in the front part. In this way, possible damage to the grain by the threshing apparatus 3 and the separation apparatus 5 is prevented. The latter can be closed when necessary, in order to convey the entire crop 24 into the threshing apparatus 3, if necessary.

The threshing apparatus 3, which is adjustable in terms of its speed of rotation, is structured as a rasp bar drum, tube or cylinder, with applied rasp bars, beater/rubbing strips 4. The rasp bars, beater/rubbing strips of the threshing apparatus acquire the crop stream tangentially. They can be structured as elastic rasp bars, beater/rubbing strips 4 composed of rubber, natural rubber or brushes, in order to minimize the proportion of broken grains. The rasp bars, beater/rubbing strips 4 can be attached by means of holders and screws or vulcanized on. The direction of rotation is counter-clockwise. The remaining grains are threshed out by means of the beating effect, rubbing effect, and separated downward into the cleaning channel, air channel (arrows) by means of centrifugal forces of the rotation through the separation apparatus 5, over almost the entire and/or the entire working width. The threshing apparatus can be structured to be small and light because of the pre-threshing of the stripper rotor (crop stripper rotor 1), and therefore great accelerated centrifugal forces for separation of the crop 24 are achieved.

The grain threshing concave (separation apparatus 5) installed for cereal grain threshing with the threshing apparatus 3 and its rasp bars, beater/rubbing strips 4 can also be replaced for rice threshing, as a spike, tooth threshing apparatus, or for other crop cultures. It can be structured as a wire basket, perforated basket or screen. Elastic basket strips can reduce the proportion of broken grains in the harvesting process.

Crop flow brake flaps 29, which are installed below the separation apparatus 5, delay the falling speed of the threshed crop downwards in the cleaning air channel (arrows), and this promotes the intensity of cleaning, because the components are impacted with air for a longer time in the falling step. The opening width of the separation apparatus 5 is structured in such a manner that a first cleaning process is already initiated, because in this way, few material other than grain is separated downward. The material other than grain in the threshing gap is conducted away towards the back into a spray guard/dust protection cover 12, by means of the counter-clockwise rotation of the threshing apparatus 3. A large wrapping angle of the separation apparatus 5 is achieved, in terms of design, by means of the feed using the chute 8 with finger comb 9, from above, and ejection of the crop 24. Further elements that promote threshing (intensive rubbing strip) or elements that reduce threshing (concave cover plates) can be installed into and/or onto the separation apparatus 5, depending on the harvesting conditions. The speed of rotation of the threshing apparatus 3 as well as the threshing gap between the separation apparatus 5 can be adjusted by means of a separation apparatus adjustment mechanism 6. Preferably, the separation apparatus 5 is suspended by means of a continuous tubular body, in sections and at the ends, in rotatable ball bearings (FIG. 5, separation apparatus adjustment mechanism 6), over the predominant part or the entire working width. By means of the radius of the defined circular path towards the front separation device adjustment mechanism 6 (FIGS. 1, 3), wherein the separation apparatus 5 is also attached by means of a continuous tube at this point, it can be opened downward and/or closed upward by means of eye screws 6 (FIG. 1), cylinders and/or similar mechanisms. A grain spray guard 26 prevents grains, seeds, for example, from being thrown out of the harvesting apparatus, behind the separation apparatus 5.

The threshed-out crop 24 (material other than grain) leaves the separation apparatus 5 towards the back and is distributed on the ground over the entire or almost the entire working width of the harvesting apparatus, by way of a spray guard/dust protection cover 12. This is affixed tightly to the threshing apparatus, to prevent over-throw of the material other than grain. As a result, a uniform distribution of these occurs over the entire working width. The spray guard/dust protection cover 12 guides the material other than grain and dust onto the ground, in order to allow the operator to have an optimal view of the harvesting apparatus at all times. An ejection drum 45 can be built in.

Preferably, the harvesting apparatus according to the invention has a crop stripper rotor 1 that generates an air stream, and/or a blower device, cleaning fan 13 that generates an air flow.

The closed and/or perforated chute 8, which is directly connected with the foreign body collection recess 28 and/or the pre-separator 7 and/or the separation apparatus 5, and the finger comb 9 are firmly connected with one another and the latter form the counter-piece to the crop stripper fingers 25 that are attached on the crop stripper rotor 1. They engage into these crop stripper fingers 25 and close the stripping slit of the crop stripper fingers 25. Thereby crop 24 that is over-thrown is passed to the threshing apparatus 3, 4 and separation apparatus 5, and the air stream of the rotor is passed more strongly in the direction below the threshing concave 5, to the cleaning apparatuses. The crop stripper rotor air stream can be passed into the air channel (arrows), underneath the chute 8, below the threshing concave 5, by way of an adjustable air guide flap 10, or the air stream is guided downward through the perforated chute 8 and the openings of the separation apparatus 5, into the cleaning air channel or the fan 13. The openings of the perforated chute 8 are structured in such a way that only the air stream can escape downward, and they do not hinder the flow of material. The air stream can be passed through the air guide flaps 10 in variable intensity and in all directions underneath the threshing basket 5. The air stream captures the material other than grain (chaff), which is also separated by the separation apparatus 5, and blows them out onto the ground, towards the back, over the predominant part of the working width or over the entire working width, in front of the spray guard/dust protection cover 12.

The fan 13 is preferably attached over the predominant part of the working width or over the entire working width, in order to support the crop stripper rotor air stream during cleaning and to blow material other than grain (chaff) in the cleaning air channel (arrows) out towards the back underneath the separation apparatus 5, into the spray guard/dust protection cover 12. The fan 13 is preferably structured as a tangential blower, cross flow fan or something similar. The fan 13 is adjustable in terms of its speed of rotation, in order to adapt the air volume and the air speed. Taking in air can take place from all sides. The possibility exists of installing the fan 13 under a bulk material trough chute 32. From there, the air flow is blown underneath the bulk material conveyor 11, by means of a channel, over the predominant part of the working width or the entire working width, in the direction of travel, and guided into the drop stage of cleaning, to blow out the material other than grain (chaff) towards the back, by means of a guide plate (air guide flap 10). A part of the material other than grain can be separated ahead of the threshing apparatus 3 by means of the air stream of the crop stripper rotor 1, by opening an optional flap 17. This flap 17 is also provided as a maintenance flap.

The cleaned crop 24 can slide towards the bulk material conveyor 11 on an adjustable, anti-static bulk material trough chute 32 having good sliding properties, which is attached over the predominant part of the working width or the entire working width, by installing this chute, which is short in terms of its inclination, the angle of which preferably amounts to more than 30 degrees. A similar chute that is adjustable in terms of its inclination can also be installed in a shorter version, above the bulk material trough chute 32. This chute can have the air flow blowing towards it. The threshed crop 24 is impacted with air for a longer time as it slides down, and this promotes the cleaning effect. Grains, seeds that are driven off towards the back fall through a gap at the end of the chute, onto the bulk material trough chute 32, because they are heavier than the chaff.

Preferably, the bulk material conveyor 11 with crop bunker, which is preferably installed over their predominant part of the working width or the entire working width of the harvesting apparatus, is situated underneath the separation apparatus 5 and the bulk material trough chute 32. The crop 24 falls into the bulk material conveyor sump in cleaned form, and is conveyed to a corresponding grain tank (FIG. 4 grain cart 21) by the bulk material conveyor 11, or elevator heads coupled with the bulk material conveyor 11 (FIG. 1) to the left and right of the harvesting apparatus allow lateral discharge onto a transport vehicle.

If the threshing, cleaning, conveying apparatuses are built somewhat narrower than the stripper apparatus in the harvesting apparatus, the elevator heads can be installed into the outer interstices. In this way, no crop 24 is pressed down laterally as it accumulates. In this case, guide plates on the left and right guide the crop 24 laterally from the stripper rotor to the threshing apparatus and separation apparatus. By shutting off the bulk material conveyor 11, the bulk material conveyor sump is used as temporary storage and/or as a bunker for the cleaned crop 24. The bunker volume can be increased by means of the inclination of the bulk material trough chute 32 downward. A roof installed above the bulk material conveying apparatus protects it from the crop weight. If the crop bunker is full, the bulk material trough chute 32 can be slowly raised, thereby causing the cleaned crop 24 to slide towards the bulk material conveyor 11.

The harvesting apparatus can also be operated without a cleaning apparatus. The grain/seed/material other than grain mixture can then be subsequently cleaned separately, in order to utilize the latter as biomass, animal feed or something else.

Simple, power-saving, low-maintenance drive of the assemblies is possible by means of the equal arrangement of the respective apparatuses behind one another and/or one on top of the other, because of the few rotating parts of the harvesting apparatus. This arrangement results in a very short linear, effective, efficient process path without deflection for the crop 24 over the predominant part of or the entire working width. Preferably, a crop stripper can also be used, which is equipped with more than one, preferably two crop stripper rotors.

The harvesting apparatus can easily be expanded in modular manner, in terms of its width, because the harvesting apparatus can be put together, at least in part, from modules, and because the modules between the frame plates or the like are identical and/or almost identical.

Preferably, the harvesting apparatus according to the invention has a running gear 18 that is directly assigned to it, which can be adjusted in terms of height and is structured so as to rotate above the wheel axle. Preferably, it is structured as a parallelogram with raising and lowering cylinders. It carries a major portion of the weight of the harvesting apparatus. With skids 23, it serves for adjusting the height of the harvesting apparatus and adapting it to the ground. A pivoting frame 43 is assigned to the harvesting apparatus. This pivot frame, slewing ring or apparatus is coupled with the drive vehicle 20 with its frame. Therefore the harvesting apparatus can follow the ground underneath independent of the drive vehicle, by means of the running gear 18 and the skids 23. If necessary, the running gear can be driven with wheel motors. In order to absorb side forces and conduct them away, a steel cable/chain 19 (FIG. 4) is stretched from the center crosspiece to the sides of the harvesting apparatus, above the crop culture.

Figure 3:
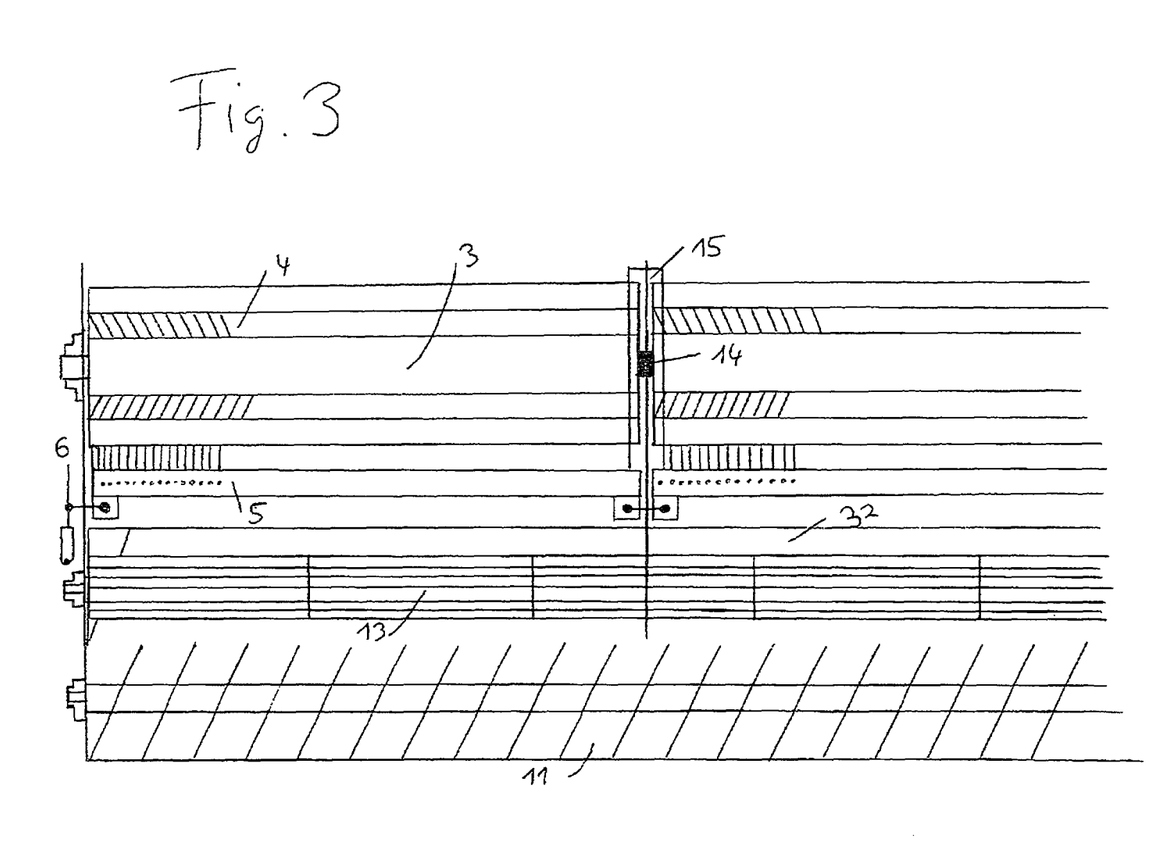
FIG. 3 is a front view of a harvesting apparatus according to the invention.

FIG. 3 shows a front view of a harvesting apparatus according to the invention. The stripping, threshing, separation, cleaning, bulk material conveying apparatuses are intermediately mounted by means of bearings 14 in the case of a great working width. Crop dividers 15 in the form of arrows guide the crop 24 past the frame plates, bearing locations (14), articulations, bezels, rollers or center drive units, on the right and the left, to the threshing element. The bezels, steady rests, rollers, bearings or articulations can support the tubular bodies. There, the stripper finger strips 25, support elements 35, and rasp bars, beater/rubbing strips, 4 are interrupted. A tubular form of the crop stripper 1, preferably structured to be cylindrical, and the threshing apparatus 3 allow a very shape-stable rotation body, thereby making it possible to install the respective units over a great working width, which reduces intermediate bearings (bearing locations 14).

Figure 4:
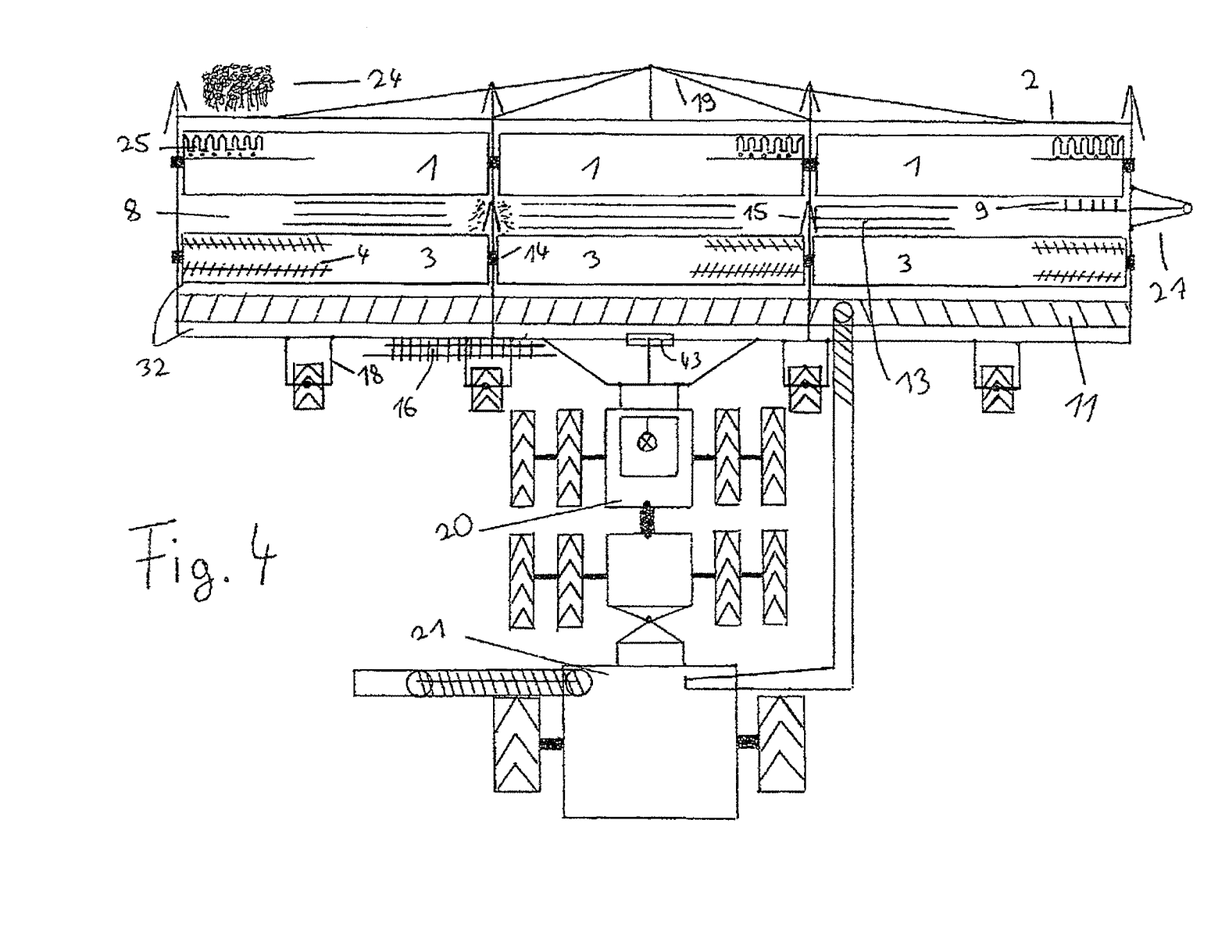
FIG. 4 is a schematic representation of a top view of a harvesting apparatus according to the invention in pushing operation in front of a tractor with a grain cart attached (shown on a reduced scale)

FIG. 4 shows a schematic representation of a top view of a harvesting apparatus according to the invention, in pushing operation in front of a tractor 20 with an attached grain cart (shown in a reduced size). The cutting, chopping apparatus 16, which is adjustable in height over the predominant part or the entire part of the working width, can be structured as an oscillating cutting tool or in rotating manner. It is preferably attached so far back that the material other than grain from the threshing apparatus 3 and the cleaning air channel (arrows) can be chopped on the field with the crop residues. The material other than grain can be cutted removed, remain standing on the field or as a chopped and broken up layer, and this promotes subsequent agricultural measures.

Figure 5:
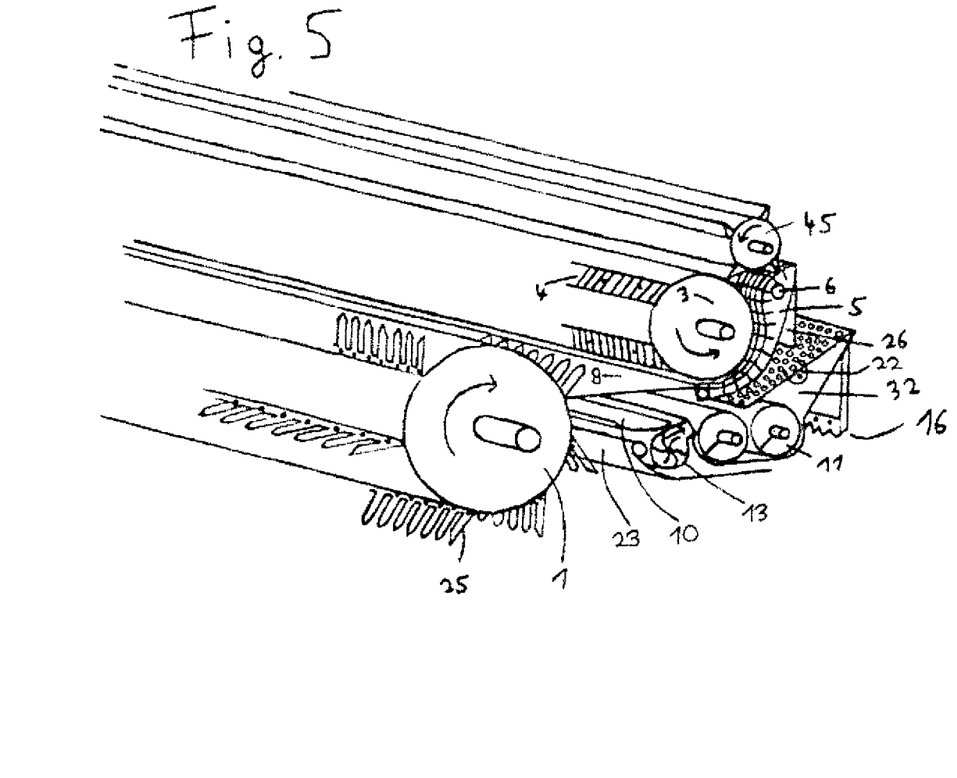
FIG. 5 is a perspective representation of a harvesting apparatus according to the invention (without nose hood and coverings).

FIG. 5 shows a perspective representation of a harvesting apparatus according to the invention (without nose hood and coverings). The harvesting apparatus can be structured with a sieve, screen (grain/seed sieve, screen chute 22) onto the threshed crop falls out of the separation apparatus 5 that shakes in a reciprocating motion towards the back. The air flow blows through or against the sieve from below and separates material other than grain (chaff) out of the back. Due to the slight feed of material other than grain of the crop stripper rotor 1 and the distribution of the crop 24 over the width, the cleaning apparatus air flow has to blow out only a few material other than grain. This arrangement promotes the purity of the product that is required for marketing.

The harvesting apparatus can either be operated in the field in pushing operation (FIG. 4), pulled or on the side. The harvesting platform can be driven mechanically, hydraulically or electrically, using a power unit in form of a tractor, drive vehicle 20. Furthermore, the harvesting apparatus can be driven by way of a separately structured motor. When attached to a combine, the latter can take on cleaning of the crop 24 and/or can be used as a bunker unit. When attached to an agricultural machine having an automatic steering system, the possibility exists of using the harvesting apparatus also for controlled traffic, smart farming.

The harvesting apparatus can be transported on a separate transport wagon or by means of an attached tow bar 27 (FIG. 4) in the longitudinal direction of travel with stabilizing wheels counterpart to the running gear 18. In this regard, road transport provisions of law are adhered to at all times.

After the harvesting apparatus is uncoupled from the drive vehicle at the end of the season, the latter can be used for other work. The compact dimensions allow simple, space-saving storage in a covered space.

Very great throughput performance can be achieved in the cultures suitable for the crop stripper, by means of the harvesting apparatus having a running gear, stripper, threshing, separation, cleaning, cutting, chopping, conveying, and bunker apparatuses over the entire and/or almost entire working width. A slight layer thickness of the crop 24 during operation, over the width, promotes the threshing, separation, and cleaning process. Uniform distribution of the residue over the entire working width promotes subsequent work and field cultures. Low production, acquisition, energy, and maintenance costs as the result of the simple, robust, straight, transparent structure and power drives, short process paths without material flow deflection, and the use of a tractor, drive vehicle 20, which can also be used for other work, allow very effective, efficient, powerful, user-friendly, and environmentally friendly use in harvesting.

Although only a few embodiments of the present invention have been shown and described, it is to be understood that many changes and modifications may be made thereunto without departing from the spirit and scope of the invention.

REFERENCE SYMBOL LIST 1 crop stripper rotor
2 nose hood
3 threshing apparatus
4 rasp bars, beater/rubbing strips
5 separation apparatus, threshing concave
6 separation apparatus adjustment mechanism
7 pre-separator
8 chute
9 finger/comb
10 air guide flap
11 bulk material conveyor with bulk material sump, bunker
12 spray guard/dust protection cover
13 blower device, cleaning fan
14 bearing
15 crop divider
16 cutting, chopping apparatus
17 flap
18 running gear
19 steel cable/chain
20 tractor, drive vehicle
21 grain cart, tank
22 grain/seed sieve, screen chute
23 skids
24 crop
25 crop stripper finger
26 grain spray guard
27 tow bar
28 foreign body collection recess
29 crop flow brake flap
30 crop lifter
31 machine covering
32 bulk material trough chute
33 telescoping arm
34 ball bearing
35 support element, flatiron
36 square structural hollow hood section
37 screw bolts
38 raising and lowering mechanism
39 nose support element
40 folded edge
41 hood support/running track
42 support element
43 pivoting frame
44 upper fixed nose hood
45 ejection drum
arrows—cleaning/air channel

What is claimed is:

1. A harvesting apparatus for harvesting cereal grains, rice, grains, or seeds, said apparatus being operated as a front, side or rear attachment and comprising:
    (a) a crop stripper extending over a working width;
    (b) an inclined chute;
    (c) a threshing apparatus connected to the crop stripper by the inclined chute,
    (d) a separation apparatus; and
    (e) a fan generating an air flow;
    wherein the crop stripper generates a crop stripper rotor air stream, wherein the inclined chute has a first edge facing the crop stripper and a second edge facing away from the crop stripper, wherein the second edge is disposed to lie lower than the first edge facing the crop stripper and is attached to and between the threshing apparatus and the separation apparatus, wherein the threshing apparatus and the separation apparatus extend over a predominant part or the entirety of the working width;
    wherein the harvesting apparatus comprises a cleaning air channel, wherein the air flow from the fan and the crop stripper rotor air stream flow through the cleaning air channel for cleaning the crop, wherein the cleaning air channel also extends over the predominant part or the entirety of the working width.

2. The harvesting apparatus according to claim 1, wherein the chute has fingers, is closed or at least partially perforated, or is an oscillating chute.

3. The harvesting apparatus according to claim 1, wherein the threshing apparatus has rasp bars or beater, rubbing strips wherein the separation apparatus has a pre-separator or crop flow brake flaps.

4. The harvesting apparatus according to claim 1, wherein the separation apparatus has a separation apparatus adjustment mechanism, a foreign body collection recess, a pre-separator and a grain spray guard.

5. The harvesting apparatus according to claim 1, wherein the crop stripper has at least one rotor that is a tubular body and the threshing apparatus has a tubular body.

6. The harvesting apparatus according to claim 1, wherein the cleaning air channel has the fan.

7. The harvesting apparatus according to claim 6, wherein the cleaning air channel has at least one finger comb at least one air guide flap, at least one screen sieve or at least one screen chute.

8. The harvesting apparatus according to claim 1, wherein the harvesting apparatus has a bulk material conveyor, a bulk material sump, a bunker unit, a cutting apparatus or a chopping apparatus, which extend over the predominant part of the working width or over the entirety of the working width.

9. The harvesting apparatus according to claim 1, further comprising a bunker unit having a bunker volume and a bulk material trough chute that can be adjusted in terms of inclination of the bulk material trough chute.

10. The harvesting apparatus according to claim 1, wherein a crop stripper rotor, the threshing apparatus, the separation apparatus, the fan and a bulk material conveyor have at least one intermediate bearing and the harvesting apparatus has crop dividers.

11. The harvesting apparatus according to claim 1, wherein the harvesting apparatus is composed of modules.

12. The harvesting apparatus according to claim 1, wherein the harvesting apparatus has a running gear, skids, stabilizing wheels, a pivoting frame or a tow bar.

13. The harvesting apparatus according to claim 1, wherein the crop stripper is a crop stripper for harvesting cereal grains, rice, grains, or seeds, having a nose hood and at least one rotor comprising a tubular body, wherein crop stripper fingers or crop stripper fingers attached to stripper strips are attached to the tubular body.

14. The harvesting apparatus according to claim 13, wherein the tubular body is round.

15. The harvesting apparatus according to claim 13, wherein each crop stripper finger has a recessed shape that is drawn downward.

16. The harvesting apparatus according to claim 13, wherein the crop stripper fingers are straight, curved or C-shaped, made from a divided tubular body, metal sheet, plastic or polycarbonate.

17. The harvesting apparatus according to claim 13, wherein the crop stripper fingers are attached on the tubular body directly or by at least one support element or the crop stripper fingers are attached on at least one stripper strip, wherein a stripper strip is attached on the tubular body directly or by at least one support element.

18. The harvesting apparatus according to claim 17, wherein the crop stripper fingers have a slit shape that ends in a radius.

19. The harvesting apparatus according to claim 17, wherein at least one support element is attached on the tubular body at an angle.

20. The harvesting apparatus according to claim 13, wherein the tubular body is supported by bearings.

21. The harvesting apparatus according to claim 13, wherein the nose hood, a flap, a spray guard/dust protection cover, and a machine covering is composed of a light, flexible, transparent, breakage-resistant, impact-resistant, self-reinforcing, anti-static, UV-resistant plastic, and wherein a lower adjustable part of the nose hood lies closely against an upper, fixed nose hood, on the inside, due to tension of the plastic.

22. The harvesting apparatus according to claim 13, wherein the nose hood is attached to structural hollow sections or tubes and the nose hood becomes adjustable in height by telescoping arms and ball bearings that can rotate, and a raising and lowering mechanism.

23. The harvesting apparatus according to claim 1, wherein the inclined chute has an inclination greater than 20 degrees.

* * * * *